(12) United States Patent
Carloff et al.

(10) Patent No.: US 8,534,903 B2
(45) Date of Patent: Sep. 17, 2013

(54) DRIVE ARRANGEMENT IN A DEGASSING EXTRUDER

(75) Inventors: Ruediger Carloff, Darmstadt (DE); Joachim Heid, Fraenkisch-Crumbach (DE); Heinz Vetter, Rossdorf (DE)

(73) Assignee: Evonik Röhm GmbH, Darmstadt (DE)

( * ) Notice: Subject to any disclaimer, the term of this patent is extended or adjusted under 35 U.S.C. 154(b) by 654 days.

(21) Appl. No.: 12/678,186

(22) PCT Filed: Aug. 12, 2008

(86) PCT No.: PCT/EP2008/060576
§ 371 (c)(1),
(2), (4) Date: Mar. 15, 2010

(87) PCT Pub. No.: WO2009/040190
PCT Pub. Date: Apr. 2, 2009

(65) Prior Publication Data
US 2011/0188336 A1    Aug. 4, 2011

(30) Foreign Application Priority Data

Sep. 20, 2007 (DE) .......................... 10 2007 045 155

(51) Int. Cl.
*B29C 47/38* (2006.01)
(52) U.S. Cl.
USPC .............................. 366/75; 366/100; 425/203
(58) Field of Classification Search
USPC .................... 366/75, 100; 425/203
See application file for complete search history.

(56) References Cited

U.S. PATENT DOCUMENTS

| | | | |
|---|---|---|---|
| 3,156,009 A | 11/1964 | Alsys | |
| 3,383,015 A | 5/1968 | Miler | |
| 3,563,514 A * | 2/1971 | Shattuck | ........................ 366/75 |
| 3,720,479 A | 3/1973 | Latinen | |
| 3,787,160 A | 1/1974 | Leister | |
| 3,797,550 A * | 3/1974 | Latinen | ........................ 159/2.2 |
| 4,118,163 A | 10/1978 | Lee | |
| 5,419,634 A | 5/1995 | Bacher et al. | |
| 6,129,873 A | 10/2000 | Shelby et al. | |

FOREIGN PATENT DOCUMENTS

| | | |
|---|---|---|
| DE | 1 629 711 | 2/1971 |
| EP | 0 723 850 | 7/1996 |

OTHER PUBLICATIONS

U.S. Appl. No. 12/678,195, filed Mar. 15, 2010, Carloff, et al.
Singaporean Search Report and Written Opinion issued Nov. 4, 2011, in Singaporean Patent Application No. 201000848-0.
Combined Taiwanese Office Action and Search Report issued Dec. 17, 2012 in Taiwanese Patent Application No. 096138680 (English Translation only).

* cited by examiner

*Primary Examiner* — David Sorkin
(74) *Attorney, Agent, or Firm* — Oblon, Spivak, McClelland, Maier & Neustadt, L.L.P.

(57) ABSTRACT

The invention relates to a vented extruder (1) for the devolatilization of a polymer material. The vented extruder (1) encompasses at least one drive (4), at least one gearbox (5), at least one rotatably driven extruder screw (3), at least one first material feed (6) and at least one extrudate outlet (13). A feature of the vented extruder (1) according to the invention is that the drive, encompassing drive (4) and gearbox (5), has been provided in the region of that end of the extruder screw (3) that is downstream in relation to the direction of conveying of the polymer.

9 Claims, 2 Drawing Sheets

DRIVE ARRANGEMENT IN A DEGASSING EXTRUDER

Figure 1:
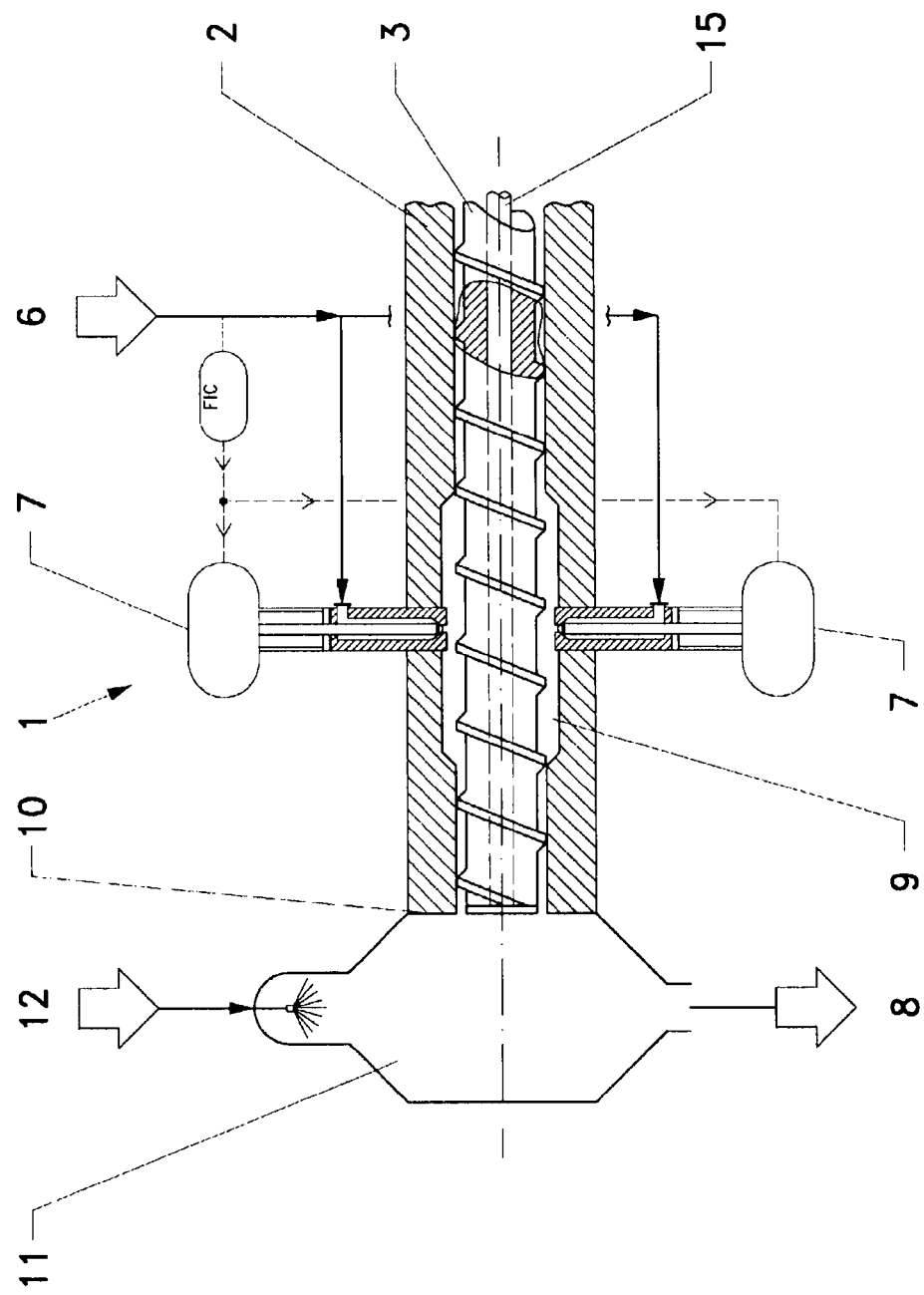

This application is a National Stage of PCT/EP08/060576 filed Aug. 12, 2008 and claims the benefit of DE 10 2007 045 155.7 filed Sep. 20, 2007.

FIELD OF THE INVENTION

The invention relates to a vented extruder for the devolatilization of a polymer material, encompassing at least one drive, at least one extrusion barrel, at least one rotatably driven, rotating extruder screw mounted in the extrusion barrel, at least one first material feed, at least one extrudate outlet, at least one vent zone and at least one gas outlet.

Polymerization processes often carry out the polymerization in a solvent. The solvent here can firstly be the monomer solution itself, or can also be an inert solvent. To simplify the terminology, the term "solvents" is intended to include the monomers. To obtain the polymer, the residual monomers or the solvent have to be removed, for example via evaporation. This devolatilization usually takes place in a vented extruder.

Prior Art

The structure of known vented extruders is usually such that the material stream to be devolatilized is introduced at the drive side of the extruder screw, and the devolatilized extrudate is conveyed towards the screw tip. Following an increase of pressure in the extruder here, there is a depressurization of the material downstream of the material feed, where the material is devolatilized at atmospheric pressure or with the aid of suction.

A single-screw extruder of the type mentioned in the introduction is described by way of example in EP 0 490 359. The extruder described in that reference encompasses an extruder casing which forms an extruder barrel, and encompasses an extruder screw rotatably mounted in the extruder barrel. The material feed in the form of an inlet hopper is conventionally provided at the drive side of the extruder casing. Devolatization takes place downstream of the material feed. The devolatilizing section of the extruder screw has a markedly reduced number of flights, thus providing in a manner known per se additional space for extrudate expansion. Behind the vent zone, immediately prior to the extrudate outlet, the extruder screw has a section with an increased number of flights, which in turn brings about a pressure rise in the region of the outlet aperture.

The extruder according to EP 0 490 359 A1 serves for the devolatilization of polystyrene with the aim of producing food packaging which is not permitted to exceed a certain limiting value for residual monomers. The material fed into the extruder is of relatively high viscosity.

However, the known extruder is not very suitable for use in a polymerization process. As previously mentioned in the introduction, polymerization is often carried out in a solvent. The material fed to the extruder is of relatively low viscosity, and the seal of the screw drive with respect to the monomers removed and/or with respect to solvent must be of appropriate design. There are sliding-ring seals of complicated design for this purpose. If polymer which, during the devolatilization process, passes into the region between the shaft seal and the point of input of the polymer syrup is in contact with the core of the screw, it is then only slowly conveyed back away from that location. The high residence time of the polymer in the region between the seal of the screw drive and the material feed leads to decomposition of the polymer when temperatures are high. Decomposed polymer residues passing back into the main stream of polymer lead to impairment of product quality.

Another solution proposed for solving the problem of sealing in the direction of the gearbox, alongside a sliding-ring seal, is flushing of the space prior to the gearbox with inert gas. This embodiment is described in JP 2003 348300 by way of example. However, a disadvantage of this proposed solution is that a large stream of inert gas is needed if the streams of monomer and/or solvent are large. This embodiment therefore leads to high operating costs and capital expenditure, since the inert gas in the monomer and/or solvent gas reduces heat transfer during condensation of the said gases. Large heat-transfer surfaces are therefore needed.

Another way of sealing the gearbox with respect to the monomer and/or solvent vapours is return of melt into the region between devolatilization and gearbox. DE 40 17 724 C1 describes this embodiment. A substream of the devolatilized polymer stream is conducted over a relatively great length of the extruder externally, or within the extruder barrel, into the region between drive and vent, and that location is applied to the screw. The screw in turn conveys the substream downstream in this region. The drive therefore has separation from the low-viscosity vapours by virtue of the melt. A disadvantage of the said embodiment is that a devolatilized substream is conducted over a relatively long path to the other end of the extruder. The product which has now been devolatilized once is then again run back through the entire extrusion space to the outlet. This repeated stressing of polymers generally leads to impairment of optical properties of the product due to prolonged thermal stress.

Object

The invention is therefore based on the object of improving, in this respect, a vented extruder of the type mentioned in the introduction.

Achievement of Object

The object is achieved via a vented extruder for the devolatilization of a polymer material, encompassing at least one drive, at least one extruder barrel, at least one rotatably driven extruder screw mounted in the extruder barrel, at least one first material feed, at least one extrudate outlet, at least one vent zone and at least one gas outlet, where a feature of the vented extruder according to the invention is that the drive has been provided in the region of that end of the extruder screw that is downstream in relation to the direction of conveying of the polymer.

This has the advantage that the drive has only to be sealed with respect to polymeric material, the viscosity of which is higher than that of monomer and solvent. Furthermore, the sealing of the drive does not have to be resistant toward the solvent used.

To summarize the invention, the drive of the extruder screw has been provided in a region of the screw where only polymeric material is present, thus permitting correspondingly simpler design of the seal. The invention therefore describes the way of designing the drive at a point in the extruder where the polymer has been very substantially previously devolatilized, and indeed notwithstanding the fact that the pressure rise would be expected to peak there, by virtue of the drag flow in the extruder.

One particularly preferred variant provides drive of the extruder screw from its downstream end. It is advantageous here that the extrudate outlet has been provided radially and/or tangentially, in relation to the longitudinal axis of the extruder.

It is likewise advantageous that the extrudate outlet is upstream of the drive, but downstream of the point of metering of the devolatilizing polymer syrup.

One preferred variant of the vented extruder provides that the extruder screw has at least two regions of oppositely conveying channel profiles, so that, in that region of the extruder screw that is adjacent to the drive, there is a reverse-conveying screw thread which ensures sealing on the drive side of the extruder. This reverse-conveying screw thread brings about return of the melt and inhibits any restriction of flow of material in the region of the extruder barrel downstream of the extrudate outlet.

The extrudate outlet has preferably been provided at that end of the downstream-conveying section (17) of the extruder screw that is downstream of the first material feed, so that both the main conveying stream and the returned melt pass into the extrudate outlet.

A restrictor ring and/or a change of diameter of the screw core has been provided in the region between the oppositely cut and conveying screw profiles.

One variant of the vented extruder according to the invention provides a second material feed to the extruder barrel in the region of the downstream end. At this point it is advisable to feed previously devolatilized polymer into the extruder, in such a way that the melt introduced at that point flushes the downstream end of the extruder screw between extrudate outlet and drive continuously with polymer in counter-current to the main stream. This eliminates polymer deposits in the said section of the extruder screw. If these deposits suddenly break away, they could lead to discoloration of the main material stream located in the extrudate outlet.

In this region of the extruder screw, there can be provided separate cooling and/or heating of the screw and/or of the extruder barrel, with the aim of advantageously influencing the viscosity of the melt in the said region. By way of example, there can be a closed vapour channel passing through this region of the extruder screw and partially filled with a volatile liquid. A further vapour channel can, of course, have been provided in the region of the extruder screw with opposite pitch. In the regions where the extruder screw cools, condensation of the vapour in the vapour channel provides heating due to heat liberated by condensation, while evaporation due to excessive temperature leads to cooling.

In the region of opposite pitch of the screw, coolant and/or hot fluid can be introduced from the outside to the screw by way of an axial hole, passing internally through the screw.

One particularly preferred variant of the vented extruder according to the invention provides that the second material feed has been attached to the extruder barrel downstream of the extrudate outlet, i.e. behind the extrudate outlet in the direction of conveying of the polymer. This feed point obtains its preferably devolatilized melt via a substream diverted in the region of the extrudate outlet and/or via a substream diverted to the extruder barrel upstream of the extrudate outlet. A portion of the devolatilized polymer stream is thus diverted at one point in the extruder, and refed in the region of return of melt. Another possibility is that the second material feed point is supplied with polymer from a second extruder.

As an alternative to this, it would be possible, by way of example, to divert devolatilized polymer from a parallel polymerization process and to feed it at the appropriate point in the extruder.

The magnitude of the second material feed stream can be adjusted by way of suitable selection of the diameter of the feed lines and/or of the feed cross section, and/or of the diversion cross section. As an alternative, it is possible to adjust the magnitude of the second material feed stream via valves and/or pumps and/or other adjustment units and/or a second extruder.

The gas outputs of the extruder can have been provided at various points, and by way of example the components to be evaporated can be dissipated in the direction of conveying of the polymer upward or towards the side. It would then be necessary to provide the gas output downstream of the material feed. As an alternative, a portion of the gas arising during the devolatilization process can also be dissipated upstream of the first material feed. The gas output would then be upstream of the first material feed. This is considered particularly advantageous, in particular in connection with the inventive design of the extruder.

The invention is illustrated below by using an inventive example, with the aid of the attached drawings.

Figure 2:
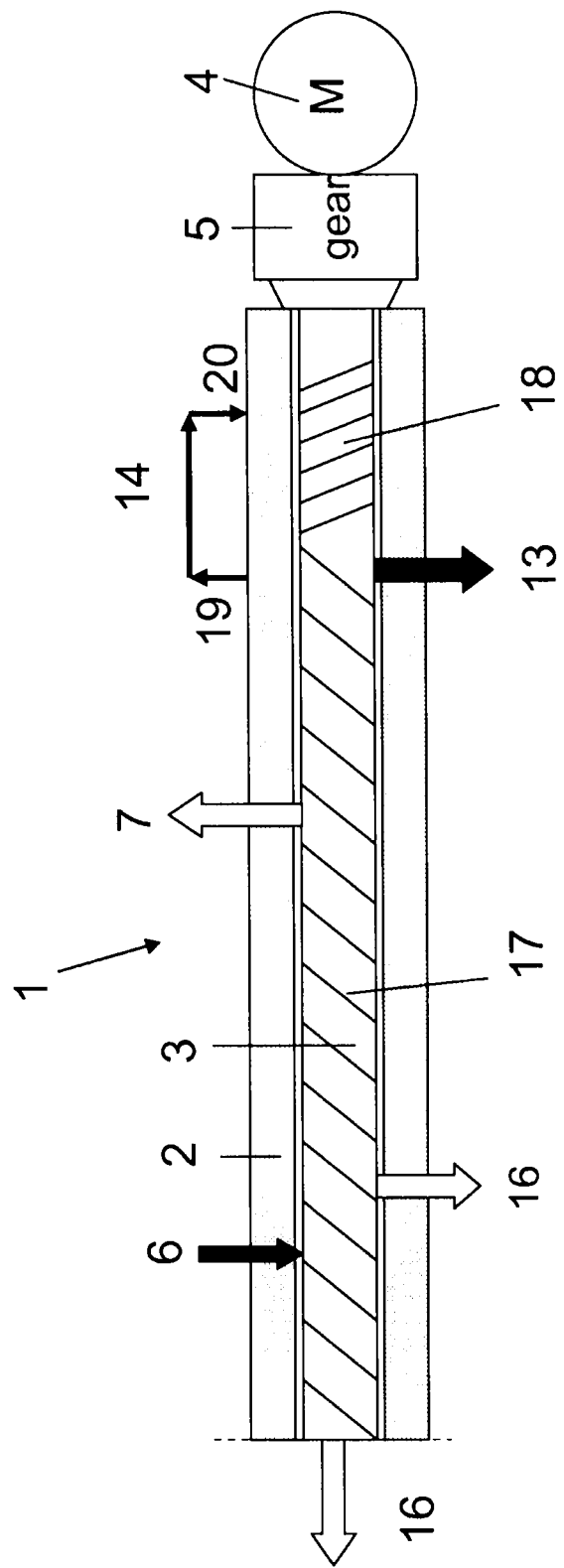

FIG. 1 is a diagram of a section of a portion of the vented extruder with a condensation chamber attached thereto and without drive, and FIG. 2 is a diagram of the vented extruder according to the invention with gearbox and motor, but without the attached condensation chamber.

FIG. 1 shows only a portion of the vented extruder (1). The vented extruder (1) encompasses an extruder barrel (2) and an extruder screw (3) rotatably mounted in the extruder barrel (2). The extruder screw (3) is rotated by a drive (4) by way of an intermediate gearbox (5).

By way of example, there can be an electric motor provided as drive (4).

As mentioned above, FIG. 1 does not show the drive (4) or the gearbox (5), the location of these being on the right-hand side of the drawing. The polymer/monomer mixture is introduced to the extruder barrel (2) by way of a branching feed line (6) at at least two diametrically opposite points on the extruder barrel (2) by way of feed valves (7).

The vented extruder 1 according to the invention has been designed as a single-screw extruder, but this could also have been designed as a twin-screw extruder.

The cross section of the extruder barrel (2) has been widened in the region of the feed valves (7), i.e. said internal diameter is larger by about a factor of from 1.01 to 3 than the regular internal diameter of the extruder barrel (2) outside the said region. The internal diameter of the extruder barrel (2) at that point corresponds approximately to the external diameter of the screw flight of the extruder screw (3) (taking into account any tolerances). The region of larger internal diameter of the extruder barrel (2) defines the vent zone. The monomer/polymer mixture and/or a solvent/polymer mixture is fed under conditions of pressure and heat into the extruder barrel (2) by way of the feed line (6). A marked pressure reduction takes place in the vent zone (9), and the monomer and/or the solvent can therefore be removed from the polymer by devolatilization. Furthermore, the flow velocity of the material is reduced in the same region. In the drawing, the polymer is conveyed towards the right in the direction of the drive. The terms "downstream" and "upstream" used in this connection always refer to the direction of conveying of the polymer.

The gas arising in the vent zone (9) or the vapour arising at that point is conveyed towards the left-hand side of the drawing, i.e. upstream of the feed valves (7).

The upstream end (10) of the extruder barrel (2) is open, and opens into a condensation chamber (11) into which the gas arising in the vent zone (9) flows in the form of superheated vapour.

(12) indicates introduction of a liquid by spraying, the liquid serving to cool and condense the gas and/or the vapour in the condensation chamber. The liquid used is advantageously miscible with the polymer, thus permitting any entrained polymer to be dissolved in the liquid. As an alternative, or in addition, other means can be used for condensation, e.g. heat exchanger and/or condensers.

As FIG. 2 shows, the drive (4) is downstream of the feed valves (7); this means that the polymer is conveyed from the end of the extruder/screw tip in the direction of the drive side.

As can also be seen from FIG. 2, the vented extruder (1) according to the invention has a tangential or radial extrudate outlet (13) at its end situated downstream of the feed point (6).

As can be seen from FIG. 1, passing axially through the extruder screw there is a closed vapour channel (15), partially filled by a volatile liquid. Evaporation of solvent or monomer leads to marked cooling of the polymer in the feed region of the extruder. The volatile liquid can, for example, be water or an inert volatile liquid, such as a vaporizable oil. The significantly cooled polymer can in turn be heated with the aid of the vapour channel along the short path, if the liquid in the vapour channel (15) condenses at that point. Alongside the heating of the extruder barrel in the feed region and the frictional heat of the extruder screw (3), the vapour channel (15) represents an additional source of heat for the (partially) devolatilized melt in the feed region of the syrup. Throughput in the extruder can thus be maximized via this embodiment. In the region of the extrudate outlet (13), evaporation within the extruder screw cools the melt or the extrudate.

Excessive frictional heat can be dissipated, thus reducing degradation of the product.

In the vented extruder (1) according to the invention, the drive (4) and the gearbox (5) have been provided at that end of the vented extruder 1 situated downstream in the direction of conveying of the polymer, i.e. at the side opposite to a first material feed (6).

The extruder screw (3) encompasses a first screw-thread section (17) in which the orientation of the channel profile causes the melt to be conveyed in the extruder barrel (2) from the first material feed (6) towards the extrudate outlet (13).

The orientation of the extrudate outlet (13) of the vented extruder (1) is tangential or radial in relation to the longitudinal axis of the extruder screw (3), the polymer thus being discharged upstream of the gearbox (5) and of the drive (4).

The extruder screw (3) furthermore encompasses a second screw-thread section (18) in which the channel profile has been oriented in such a way as to achieve reverse conveying opposite to the direction of conveying of the first screw-thread section (17). The second screw-thread section (18) therefore serves for sealing on the drive side of the extruder with respect to the main flow of the polymer.

(19) indicates a flow branch deviating from the main flow of the polymer and fed by way of a by-pass (14) and a second material feed (20) into the region of the second screw-thread section (18) of the extruder barrel (2). The by-pass can run outside or inside the extruder barrel. The flow branch of polymer deviating from the main flow brings about, in the region of the second screw-thread section (18) of the extruder screw (3), constant back-flushing with fresh polymer. In this region, the polymer is conveyed from the direction of the gearbox (5) in the direction of the extrudate outlet (13). This therefore prevents any polymer residues from remaining at that point downstream of the extrudate outlet (13).

As can be seen from the drawing, the extrudate outlet (13) is in the region of the downstream end of the first screw-thread section (17).

The known type of heating is advantageously used to heat the vented extruder according to the invention. The position of the extruder when in use is horizontal, as shown in the drawings.

Key

1 Vented extruder
2 Extruder barrel
3 Extruder screw
4 Drive
5 Gearbox
6 Feed line
7 Feed valves
8 Condensate run-off
9 Vent zone
10 Upstream end of vented extruder
11 Condensation chamber
12 Spray introduction
13 Extrudate outlet
14 By-pass
15 Vapour channel
16 Gas outputs
17 First screw-thread section
18 Second screw-thread section
19 Branch deviating from polymer flow
20 Second material feed
    FIG. 1

The invention claimed is:

1. A vented extruder for devolatilization of a polymer material, comprising at least one drive, at least one extruder barrel, at least one rotatably driven extruder screw mounted in the extruder barrel, at least one first material feed, at least one extrudate outlet, at least one vent zone and at least one gas outlet, wherein
    the drive is in a region of an end of the extruder screw that is downstream in relation to a direction of conveying of the polymer,
    wherein a second material feed is provided to the extruder in the region of the downstream end, and wherein a location of the second material feed in the extruder is downstream of the extrudate outlet, and the second material feed obtains a devolatilized melt by at least one of a substream diverted in the region of the extrudate outlet, a substream diverted in the extruder barrel upstream of the extrudate outlet and a substream diverted from an extrudate-outlet line.

2. The vented extruder according to claim 1, wherein the drive drives the downstream end of the extruder screw.

3. The vented extruder according to claim 1, wherein the extrudate outlet is provided radially and/or tangentially, in relation to the longitudinal axis of the extruder.

4. The vented extruder according to claim 1, wherein the extrudate outlet is upstream of the drive.

5. The vented extruder according to claim 1, wherein the extruder screw has at least two regions of oppositely conveying channel profiles.

6. The vented extruder according to claim 1, wherein the extrudate outlet is provided at an end of the downstream-conveying screw-thread section that is downstream of the first material feed.

7. The vented extruder according to claim 1, wherein the second material feed is supplied from a second extruder.

8. The vented extruder according to claim 1, wherein a stream of material relating to the second material feed is adjustable.

9. The vented extruder according to claim 1, wherein at least one of a restrictor ring and a change in diameter of a screw core is provided in a region between the oppositely cut and conveying screw profiles.

* * * * *